March 10, 1953  A. E. KANODE ET AL  2,630,990
RETRACTABLE LANDING GEAR
Filed March 1, 1951  4 Sheets-Sheet 1
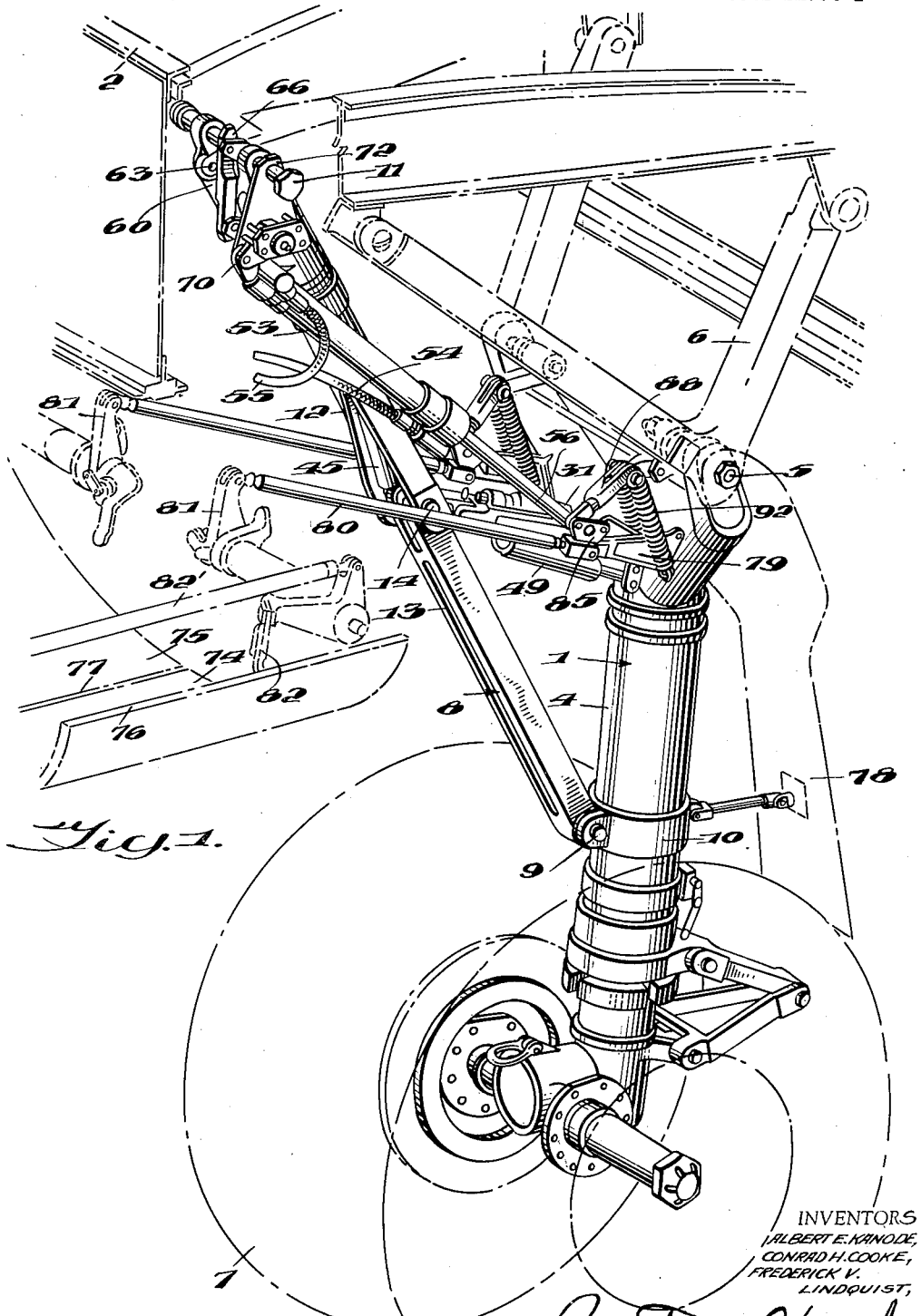
Fig. 1.
INVENTORS
ALBERT E. KANODE,
CONRAD H. COOKE,
FREDERICK V. LINDQUIST,
BY 
ATTORNEY

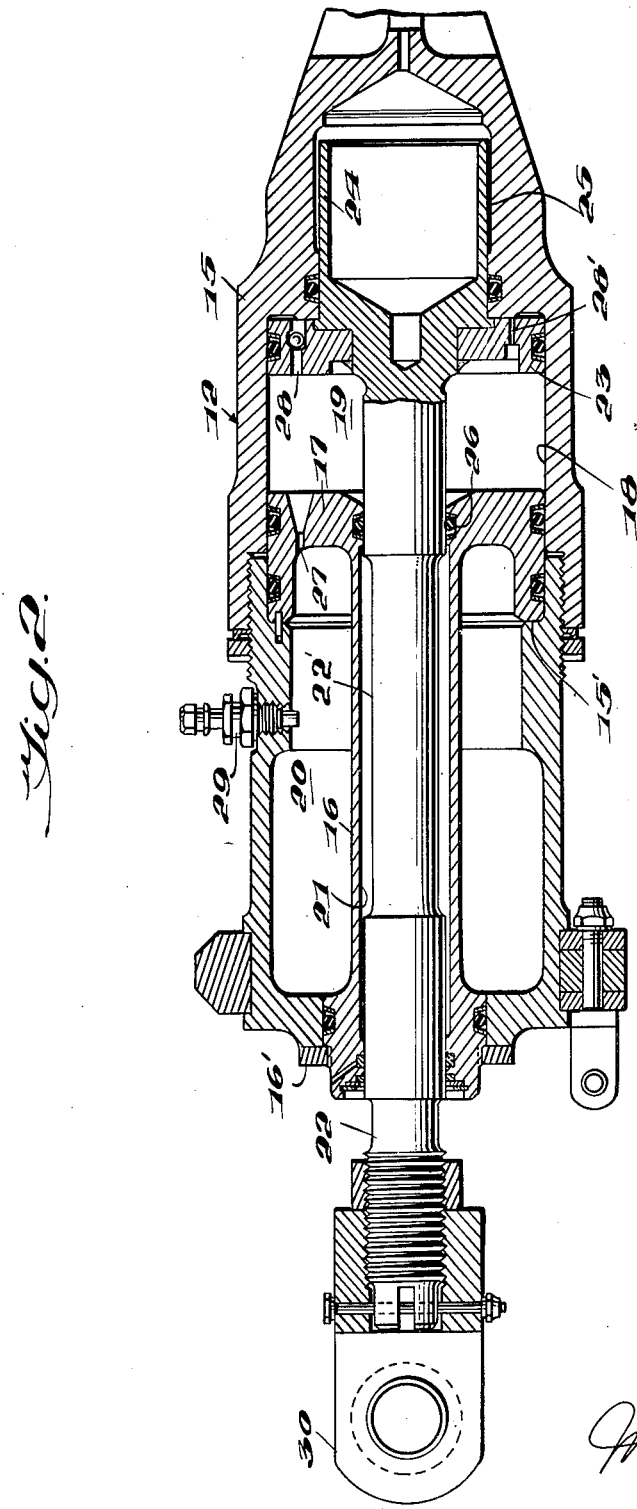

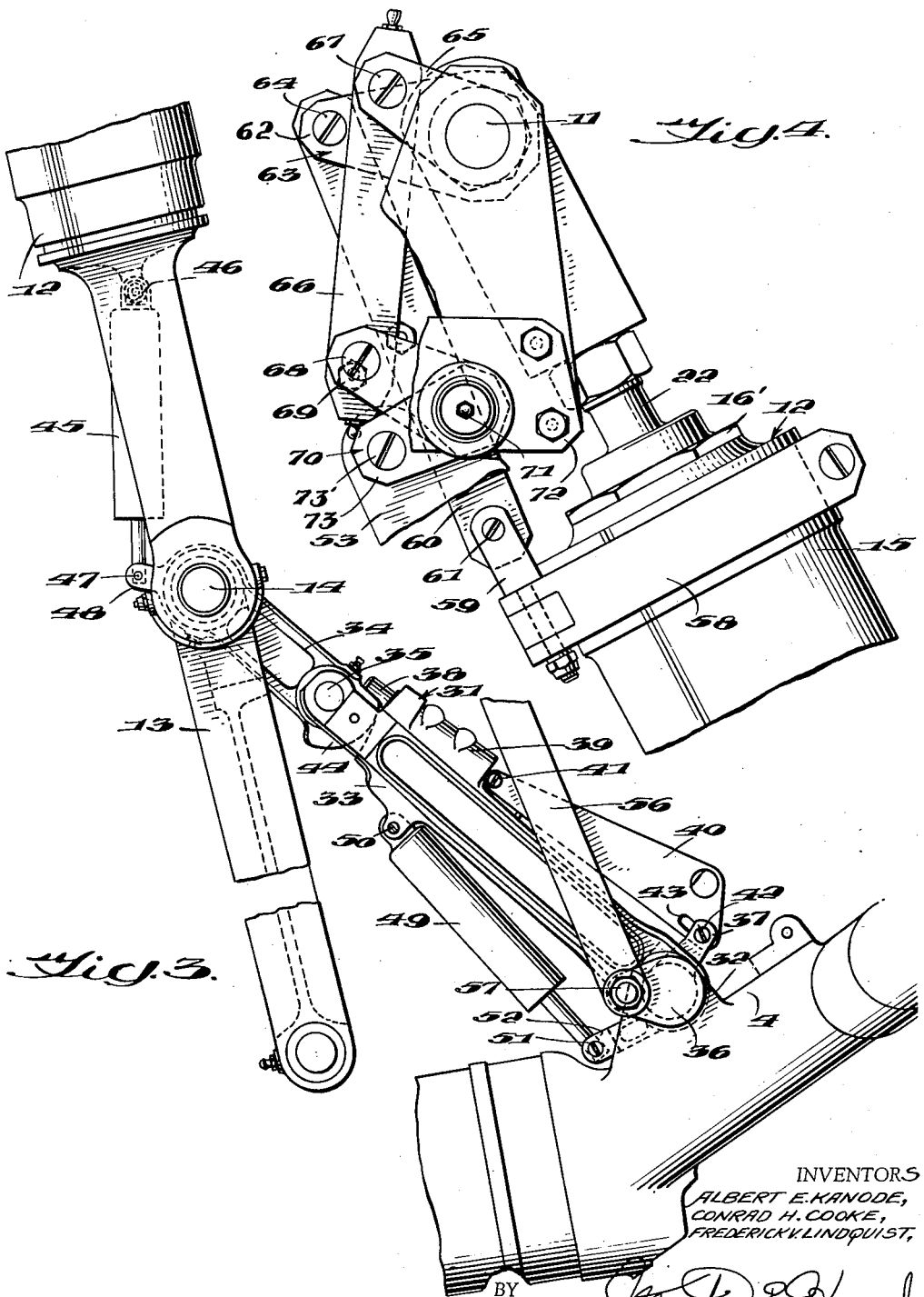

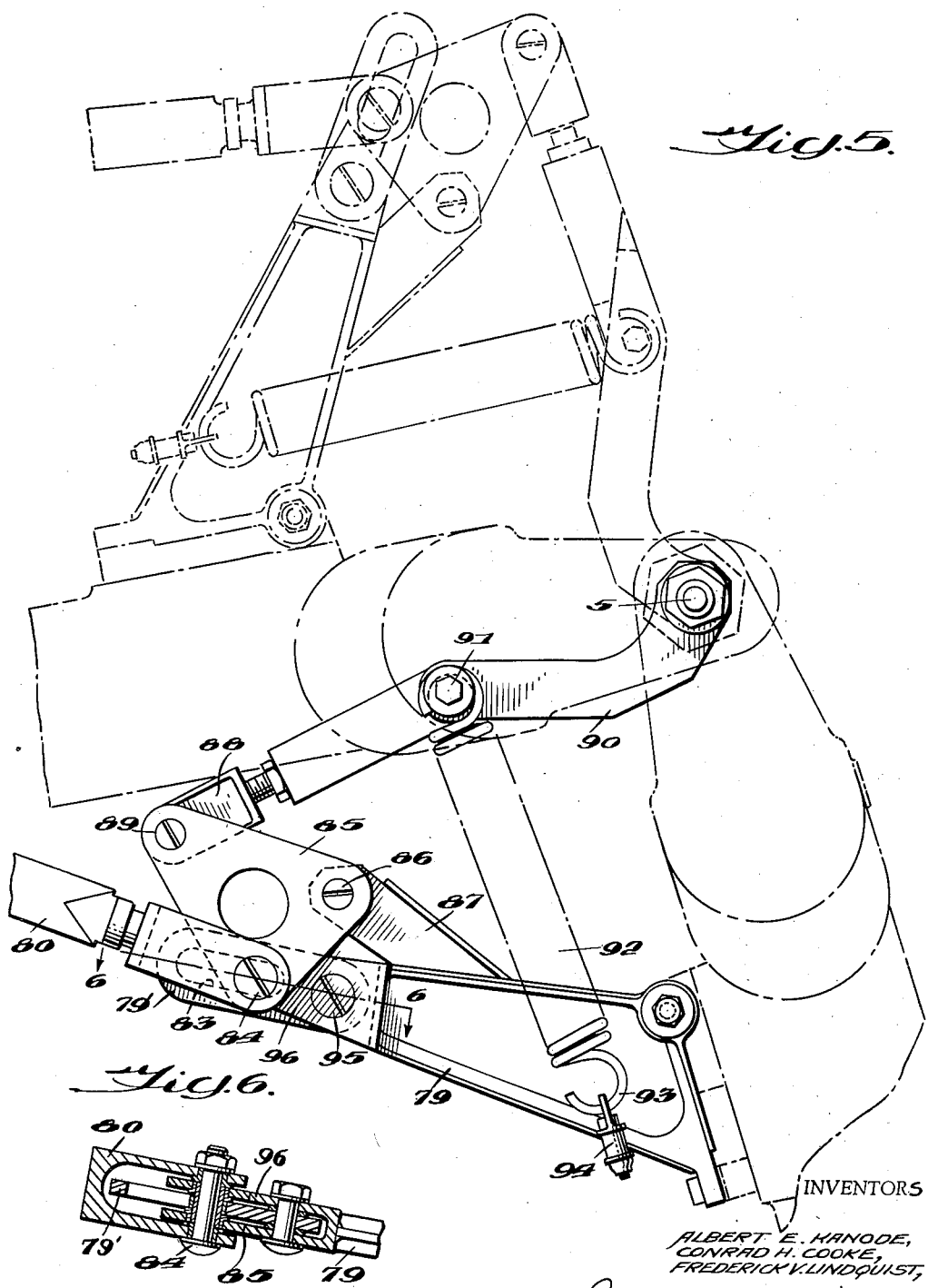

Patented Mar. 10, 1953

2,630,990

UNITED STATES PATENT OFFICE 2,630,990

RETRACTABLE LANDING GEAR

Albert E. Kanode, Towson, Conrad H. Cooke, Baltimore County, and Frederick V. Lindquist, Baltimore, Md., assignors to The Glenn L. Martin Company, Middle River, Md., a corporation of Maryland Application March 1, 1951, Serial No. 213,358

9 Claims. (Cl. 244—102)

This invention relates to aircraft landing gear of the retractable type employing a shock absorbing drag strut.

Many present day aircraft provide shock absorption devices for damping dynamic loads in only the vertical direction, even though it is well recognized that drag loads due to wheel "spin-up" when contacting the ground, produce stresses which are in many cases even greater in magnitude than are the stresses produced by the vertical loads.

In the slower type aircraft where vibration effects were not critical, or at least not thought to be, the gear and gear supporting structure could be made sufficiently heavy and rugged to satisfactorily take the dynamic loads and still be lighter than would result by attempting to dampen the shock loads in the drag strut by use of conventional shock absorbing devices. Higher landing speeds, however, have increased the severity of the shock loads to such an extent that even if the structure is designed to withstand the magnitude of the applied dynamic loads, the resulting uncontrolled vibrations from wheel spin-up at ground contact cause the metal to work harden and become quite brittle and weak after a short period of use. This effect is almost impossible to detect before actual failure has occurred. The great majority of landing gear failures has been attributed to this very phenomena commonly called "fatigue."

It is among the objects of this invention to provide a retractable landing gear with a completely self-contained shock-absorbing drag strut which effectively eliminates structural failures due to uncontrolled vibrations and which weightwise favorably compares with the conventional fixed strut installations. The light-weight air-oil shock absorber of this invention cooperates with the main oleo to damp out all vibratory oscillations in the gear, permitting substantial weight savings to be realized in the gear reaction structure as well as in the gear itself.

Another object of this invention is to provide a retractable landing gear having a shock absorbing drag strut with an automatic up and down lock and compensating mechanism to prevent the gear from collapsing while allowing the shock loads to be properly damped.

Still another object of this invention is to provide a retractable landing gear having a shock absorbing drag strut with door opening and closing means operable by movement of the gear adapted to open landing gear doors only while raising and lowering the gear, and wherein the shock loads may be properly damped without affecting its operation.

Further and other objects will become apparent from the accompanying description and drawings which form a part of this disclosure and in which like numerals refer to like parts.

In the drawing:

Figure 1 is a perspective view of the complete landing gear of this invention carried by wing structure of an aircraft.

Figure 2 is a sectional view of the shock absorbing drag strut.

Figure 3 is a side view of the up and down lock mechanism.

Figure 4 is a fragmentary side view of the compensating mechanism.

Figure 5 is a side view of the door opening and closing mechanism in both the up and down positions of the gear.

Figure 6 is a sectional view taken on the line 6—6 of Figure 5.

In Figure 1, for purposes of description, landing gear 1 is shown carried by the wing of an aircraft outboard of the fuselage as noted by the wing front spar and reinforcing structure 2. Main oleo 4 is pivotally carried in a conventional manner as at 5 by a pair of V-shaped brackets 6, rigidly connecting with the wing structure 2. The lower end of main oleo 4 is adapted to rotatably support a pair of wheels 7 and allow limited axial movement thereof with respect to the supporting structure for cushioning vertical loads of the aircraft. To prevent main oleo 4 from swinging freely about its pivot, a drag strut 8 is pinned at 9 to a bracket 10 carried by main oleo 4 and is swingably carried at its opposite end by pin 11 rigidly carried by the front spar structure 2. Drag strut 8, being of the shock absorbing type, is specially adapted to control the vibrations set up in the gear due mainly to wheel spin-up at ground contact. As generally shown in Figure 1, drag strut 8 is a toggle linkage formed of two members, one being the shock absorbing unit 12, and the other being a swingable extension 13 of the shock absorbing unit, wherein the swingable member and shock absorber are joined by means of pin 14.

Shock absorber 12 employs air and oil to absorb the shock loads in a self-contained two chamber system which results in a light-weight construction permitting an efficient landing gear design. As shown in Figure 2, tubular housing 15 of shock absorber 12 is provided with a generally cylindrical bore 16 adapted to receive a tubular partition member 16, which extends part-way through the length of the bore and is fixedly carried therein by an abutment 15' and nut 16'. A bulkhead 17, forming an integral part of partition member 16 engages the inner wall of bore 18 of housing 15 to form a piston chamber 19 and an annular reservoir chamber 20. Partition member 16 is provided with an axial bore 21 extending therethrough adapted to slidably receive a piston rod 22 which extends from a pivot connection with pin 11 at end 30 into piston chamber 19. Member 22 is provided with a reduced diametral portion 22' to reduce the frictional resistance to axial movement through bore 21. A stepped piston 23 is rigidly carried by piston rod 22 within chamber 19. Stepped piston 23, is provided with a hollow extension 24 forming the step wherein its diameter is larger than the diameter of rod 22 on the opposite side of piston 23, but is of a lesser diameter than the diameter of the piston. Extension 24 is adapted to be slidably received in a bore 25 in housing 15 to help guide the axial movement of piston rod 22 in absorbing shock loads and also to produce a change in the volume of piston chamber 19 as rod 22 is moved through its limited axial distance. Piston rod 22 being supported by several bearing surfaces throughout its length greatly increases the ability of the shock absorber to withstand high bending loads. Suitable sealing means are provided as at 26 to insure fluid tight piston and reservoir chambers. An orifice 27 is formed in bulkhead 17 so as to allow fluid communication between the two chambers. A large orifice 28 and a small orifice 28' are formed in piston 23 to allow fluid to pass through to either side of the piston. Orifice 28 is of the one-way type adapted to permit the flow of fluid therethrough from the reservoir side of the piston chamber to the opposite side of the piston, but will not permit flow therethrough in the other direction. Orifice 28' allows the flow of fluid in either direction. A valve 29 communicating with reservoir chamber 20 through housing 15 provides a means for filling both chambers with fluid and also for forcing air under pressure into the reservoir chamber. The air is under sufficient pressure to resist the static forces while the oil is employed to cushion the dynamic loads. The area on one side of the piston being larger than on the other side, it is obvious that the normal no load position of the piston is as shown in Figure 2, resting against the bottom of the bore in housing 15. Thus it is obvious that the shock absorber specifically described is adapted to function where the initial shock load produces tension in the drag strut.

For the shock absorber to function properly, the piston chamber must always be full of oil. Because the fluid volume of the piston chamber varies with the axial movement of piston member 22, the size of the orifices relative to one another is important if this condition is to be maintained. Thus the flow of fluid through orifice 27 must have a ratio with the flow of fluid through orifices 28 and 28' equal to or less than the ratio of the smallest piston chamber volume to the difference between the smallest piston chamber volume and the largest piston chamber volume. Also, the flow of fluid through orifice 28' must be less than the flow of fluid through orifice 27. By varying the size of these orifices, keeping of course, within the required relationship, a considerable variation in the amount of damping action can be attained. Damping effect in one direction can be made greater or less than the damping effect in the opposite direction. Though the use of two orifices in the piston is the simplest way of obtaining the proper shock absorption, it is believed obvious that one orifice would suffice so long as the proper ratio of that orifice to the orifice in bulkhead 17 was maintained so as to keep the reservoir chamber filled with fluid under all operating conditions.

To positively control the raising and lowering of landing gear 1 and to hold it in the fully retracted and extended positions, a locking mechanism 31 is provided as best shown in Figure 3. Locking mechanism 31 is pivotally carried at one end by main oleo 4 through brackets 32 formed integral therewith and extends to pivotally engage pin 14 joining the swingable extension member 13 of the drag strut with the shock absorber 12. Locking mechanism 31 includes two members 33 and 34 forming a toggle type linkage, pivotally connected to one another at 35. The pivots about which the components of the landing gear are adapted to swing are so arranged that when the gear is locked in the down position, members 33 and 34 of the locking mechanism are in coaxial alignment as are the two members of the drag strut. The gear is also adapted for movement so that the two members 33 and 34 of locking mechanism 31 are again in coaxial relationship when the gear is fully retracted, thus also locking it in that position. Member 33 of locking mechanism 31 is pivotally carried by brackets 32 on main oleo 4 through a crank shaft 36 which is suitably rotatably supported in brackets 32. An arm 37 is rotationally rigid with crank shaft 36 so that rotation of the crank shaft will cause axial movement of a pin 38 adapted to lock and unlock members 33 and 34 in their co-axial position when the gear is fully up and fully down. Pin 38 is carried within a guide 39 forming an integral part of member 33. Guide 39 is provided with suitable spring means (not shown) which tends to maintain pin 38 in its fully extended position shown in Figure 3. Link 40 pivotally connects with pin 38 at 41 and with arm 37 through a pin 42 and slot 43 arrangement. The use of slot 43 in member 40 is necessary to allow pin 38 to remain retracted during the up and down movement of the gear. Since pin 38 is spring loaded so as to have a tendency to remain in a fully extended position, a cam 44 is provided on member 34 which contacts the end of pin 38 to hold it in its retracted position when the members 33 and 34 are not in their coaxial positions required for the locked condition. A tension bungee spring 45 is pivotally connected at 46 to housing 15 on shock absorber 12 and at 47 to a protrusion 48 on member 34 rigidly extending beyond pin 14. Spring 45 tends to maintain members 33 and 34 in their locked co-axial position. A compression bungee spring 49 is pivotally carried at 50 on member 33 and also at 51 to a lever 52, rotationally rigid with crank shaft 36. When crank shaft 36 is rotated so as to retract pin 38, lever 52 causes bungee 49 to overpower tension bungee spring 45 and thus cause members 33 and 34 to swing about pivot 35 from their coaxial relationship for unlocking the gear.

The power means to raise and lower the gear is provided by a conventional hydraulically actuated retracting cylinder 53 as shown in Figure 1 wherein 54 and 55 designate fluid lines into the retracting cylinder necessary to both raise and lower the gear. The gear retracting piston rod 56 extends from within the retracting cylinder 53 to pivotally engage crank shaft 36 at pin 57 as shown in Figure 3. When piston rod 56 is in its normally extended position, crank shaft 36 is so positioned as to allow pin 38 to lock the gear in its down position after bungee spring 45 causes members 33 and 34 to move into their co-axial positions. When the gear retracting piston rod 56 is in its normally retracted position with the gear up, crank shaft 36 is so positioned as to again allow pin 38 to lock the two members 33 and 34 in their co-axial positions.

Since shock absorbing drag strut 8 permits limited swinging movement of main oleo 1 due to the axial movement between piston member 22 and housing 15 in absorbing the shock loads, if the upper end of retracting cylinder 53 were fixedly connected to aircraft structure, such gear movement would obviously cause rotation of crank shaft 36 which would in turn unlock the gear. Therefore a compensating mechanism as best shown in Figure 4 must be employed to insure that retracting cylinder 53 moves with the movement of the gear due to shock loads. This is provided for by a link arrangement operated by relative movement between piston member 22 and housing 15 of shock absorber 12 in drag strut 8. A collar 58 is fixedly connected to housing 15 of shock absorber 12 and is provided with a stub member 59 adapted to pivotally connect with a link 60 at 61. Link 60 extends substantially parallel to piston member 22 to pivotally connect with an arm 62 of a bell crank 63 by means of pin 64. Bell crank 63 is adapted to pivot about pin 11 which also supports piston member 22 of shock absorber 15. Thus it is seen that relative movement between piston member 22 and housing 15 of shock absorber 12 will cause proportionate movement of bell crank 63. The other arm 65 of bell crank 63 pivotally engages a second link 66 through pin 67. The opposite end of link 66 engages a pin 68 on an arm 69 of a second bell crank 70. Bell crank 70 is adapted to pivot about pin 71 which is held fixed with respect to pin 11 by means of a bracket 72. The other arm 73 of bell crank 70 pivotally carries gear retracting cylinder 53 by means of pin 73'. With this mechanism, the axial movement in drag strut 8 is compensated for so as to maintain the distance between pin 73' and pivot 57 substantially constant, thereby insuring proper operation of locking mechanism 31.

Landing gear 1, in its retracted position is adapted to be completely confined within the contour of the aircraft. Therefore, it is necessary to employ a system whereby doors open to permit raising and lowering of the gear. It is also desirable that the airplane configuration be as "clean" as possible even with the gear extended. To obtain this result, it is necessary that the doors open only while the gear is being moved from the fully retracted position to the fully extended position and vice versa. Such a system is incorporated in this landing gear as shown in Figure 1 wherein the movement of the gear is caused to open and close doors 74 and 75 which are hinged to swing about axes located approximately along the upper edge as at 76 of door 74. The doors 74 and 75 in closed position as shown in Figure 1 mate with one another at 77 to form a completely enclosed compartment within the confines of the aircraft for stowing the gear. A small flap 78, which is adapted to move with main oleo 4, covers the portion of the opening not covered by doors 74 and 75. Since flap 78 is not adapted to close when the gear is down, movements of the gear due to the use of the shock absorbing drag strut 8 do not adversely affect its operation. However, since doors 74 and 75 must remain closed while the gear is down, it is necessary to employ a linkage system which will maintain a constant force tending to close the doors irrespective of axial movement of drag strut 8. This is accomplished through a spring-loaded lever system as best shown in Figures 5 and 6.

A pair of brackets as 79, rigidly connecting with main oleo 4, extend forwardly thereof, as shown in Figure 1, to connect with a pair of rod members as 80 which are adapted to move axially in one direction to open the doors 74 and 75 and to move in the opposite direction to close the doors while either lowering or raising the gear. Rods 80 pivotally engage a pair of bellcrank-like members 81 as shown in Figure 1. The movement of members 81 is such as to open and close the doors 74 and 75 through suitable linkages 82. Member 82' of linkage 82 extends forwardly to similarly connect with the door at its forward end. To prevent the closing force on the doors from becoming excessively high, when the drag strut 8 moves axially to absorb shock loads, the movement of each door is controlled by a rod member 80 which engages the tip portion 79' of bracket 79 through a slot 83 and pin 84 arrangement, best shown in Figure 5. The tip portion 79' of bracket 79 is adapted to pivot about pin 95 to allow the necessary movement in the mechanism. A bell crank 85 adapted to pivot about pin 86 on arm 87 of bracket 79, also engages pin 84 to control the position of the pin with respect to its slot 83. An abutment 96 on bracket 79 limits the movement of bell crank 85. A link 88 pivotally connects with bell crank 85 through pin 89. The position of the bell crank is controlled by movement of link 88 to insure proper closing of the doors while the gear is extended. A second link 90 pivotally connects with link 88 at 91 and is pivoted at its opposite end to the main gear pivot pin 5. The necessary force to keep the door closed is applied through link 88 by spring 92 which is connected to pivot pin 91. Tension in spring 92 is obtained by hooking its lower end 93 into an eye bolt 94 on bracket 79. Eye bolt 94 is adjustable so as to increase or decrease the tension force in spring 92. The force applied to bell crank 85 by such a mechanism will, as seen in Figure 5, tend to rotate the bell crank about pivot 86 in a counterclockwise direction so that it will butt against abutment 96. The relationship between member 80, bracket 79 and bell crank 85 is most clearly shown in Figure 6 wherein a sectional view of that connection is taken on the line 6—6 of Figure 5. Note in Figure 5 that the force required to keep the door closed when the gear is down is obtained through spring 92, but when the gear is in the retracted position, the door is held in closed position by a rigid mechanical linkage. This is necessary to prevent the doors from swinging open when maneuvering the aircraft during flight in such a manner as to produce high inertia forces tending to open them.

To lower the landing gear, retracting cylinder 53 is actuated so as to axially move member 56 to an extended position. The initial movement of member 56 causes rotation of crank shaft 36 in a direction to retract pin 38 and load compression bungee spring 49 so as to overpower tension bungee 45 and cause members 33 and 34 to move out of their co-axially aligned locking position, thus starting the gear in its downward motion. As the gear moves down, the first movement of rod 80 will open the doors while the movement of the gear after it has passed through the open doors will close them. When the gear is fully extended, doors 74 and 75 are thereby closed and locking mechanism 31 is automatically moved into the locking position with the aid of bungee spring 45.

The most critical period of operation of the gear is of course when landing the aircraft. When the wheels first contact the ground, due to the forward velocity of the aircraft, they are caused to spin-up, that is, to start rotating at a peripheral speed equal to the forward velocity of the aircraft. This induces very large dynamic drag forces in the gear and gear reaction structure which, if uncontrolled, will set up high frequency vibrations resulting in rapid deterioration of the strength giving properties of the metal as hereinbefore described.

Drag strut 3 is adapted to absorb the dynamic drag loads and eliminate the accompanying vibratory oscillations. This is efficiently accomplished by the air-oil shock absorber 12. The air in the reservoir chamber is under sufficient pressure to prevent axial movement of piston rod 22 relative to housing 15 under static load conditions, but will allow relative movement therebetween upon application of dynamic loads. When the piston moves from the static load condition shown in Figure 2, oil is forced through orifice 28 and into the chamber on the opposite side of the piston. Since a volume reduction occurs, some of the oil in the piston chamber will also flow into the reservoir chamber through the orifice in bulkhead 17. The greater piston area being on the reservoir side, the air pressure tends to return the piston to its static load position. This motion is controlled by the passage of oil back through orifice 28' from the space provided by the initial movement of the piston. The rate at which fluid is allowed to flow through the orifice controls the damping action of the shock absorber so as to prevent repeated oscillations.

The action of the shock absorber obviously causes the drag strut to increase in length which in turn causes the main oleo to swing rearwardly. This of course causes relative movement between the entire gear and its supporting structure. By using the compensating mechanism as shown in Figure 4, the position of retraction cylinder 53 is controlled by relative movement between the piston member 22 and housing 15 of the shock absorber to fix its movement with respect to the gear. Thus as the gear pivots rearwardly, the retraction cylinder 53 moves downwardly in accordance with the movement of arm 73, thereby eliminating the possibility of member 56 rotating crank shaft 36 and unlocking the gear.

Since the door is maintained in its closed position when the gear is down by a force produced in spring 92, movement of main oleo 4, caused by the shock absorber, will not affect the operation of the doors. They will be held in closed position by a substantially constant spring force.

To retract the gear, retracting cylinder 53 is actuated so as to cause member 56 to move axially into the housing of the retracting cylinder. The initial movement of member 56 rotates crank shaft 36 which causes pin 38 to be drawn back out of contact with member 34 and at the same time, causes compression bungee 49 to overpower tension bungee 45 and unlock mechanism 31 to allow the gear to begin retracting upon further actuation of retracting cylinder 53. The initial retracting movement of the gear pushes on rods 80 to cause doors 74 and 75 to open so that the main oleo may pass through the opening thus provided. As the gear passes through the opening and out of the slipstream, the pivot locations are such that a pull force is applied to rods 80 for closing the doors. When the gear is fully retracted, the doors are again in closed position and members 33 and 34 of locking mechanism 31 swing into co-axial, locked alignment with the assistance of bungee spring 45.

Though the landing gear is described in considerable detail as a main gear connected to the aircraft wing structure, it obviously is equally useful as a nose gear as well as a main gear and is not limited to any specific location on the aircraft. It is to be further understood that certain changes, alterations, modifications and substitutions can be made to the described structure without departing from the spirit and scope of the appended claims.

We claim as our invention:

1. A retractable landing gear for an aircraft having a door adapted to open only while raising and lowering said gear and wherein the movement of said gear operates said door comprising, a main oleo pivotally carried by said aircraft, a shock absorbing drag strut pivotally connected to said oleo and to said aircraft, said strut being allowed limited telescopic movement for absorbing shock loads in said gear, a locking mechanism connected at one end to said strut and at its opposite end to said oleo, an actuating cylinder connecting with said locking mechanism for raising and lowering said gear, said locking mechanism being operated by relative movement between said actuating cylinder and said oleo, a compensating mechanism carried by said aircraft and connecting with the free end of said actuating cylinder, said compensating mechanism being responsive to telescopic movement of said drag strut for maintaining said actuating cylinder and said oleo in substantially fixed relative positions irrespective of gear movement due to shock loads, and means connecting with said oleo and said door maintaining said door in closed position in both retracted and extended positions of said gear irrespective of telescopic movement in said drag strut.

2. An aircraft landing gear of the retractable type having a shock absorbing drag strut, actuating means mounted therewith for raising and lowering said gear, locking means carried by said gear and responsive to relative movement between said actuating means and said gear for locking said gear in down position, and compensating means connecting with said strut for maintaining said actuating means and said locking means in substantially fixed relative positions irrespective of relative movement between said gear and aircraft due to variations in the length of said strut in absorbing shock loads whereby dependable automatic operation of said locking means is obtainable.

3. A retractable landing gear for aircraft comprising an oleo pivotally carried at one end thereof by said aircraft, a drag strut connecting at one end to said aircraft and at its opposite end to said oleo, said strut including a shock absorber having a generally tubular housing forming a piston chamber and a reservoir chamber in coaxial alignment, a piston carried within said piston chamber, a piston rod extending axially into said housing and rigidly connecting with said piston, orifices providing pressurized fluid communication between said chambers and through said piston, said piston having a greater working area on one side than on the other tending to maintain it in an extreme axial position within said piston chamber due to fluid pressure, said rod extending axially beyond said housing providing one end of said strut, an arm connecting with the free end of said housing providing the opposite end of said strut, a locking mechanism carried by said gear, an actuating cylinder supported by said aircraft and connecting with said locking mechanism for raising and lowering said gear, said locking mechanism being responsive to relative movement between said actuating cylinder and said oleo for locking and unlocking said gear, and compensating means connecting with said strut and actuating cylinder for maintaining said actuating cylinder fixed relative to said oleo irrespective of axial movement of said drag strut to prevent inadvertent unlocking of said gear.

4. A retractable landing gear for an aircraft comprising, a wheel supporting member pivotally carried at one end thereof by said aircraft, a drag strut including a piston rod pivotally connecting at one end with said aircraft, a stepped piston formed on the free end of said rod, said piston having a larger working area on one side than on the other, a generally tubular housing having a piston chamber and an annular reservoir chamber, said housing being adapted to receive said piston and rod and allow limited axial movement thereof relative to said housing upon application of dynamic loads, said piston and reservoir chambers being fluid tight and in communication with one another so as to allow fluid under pressure to flow into and out of the piston chamber, an orifice through said piston for allowing fluid flow therethrough on either side thereof upon axial movement of said rod relative to said housing, an arm pivotally connecting at one end with the free end of said housing and at its opposite end to said wheel supporting member, a toggle link connecting at one end with said wheel supporting member and at its opposite end with said drag strut for limiting the movement of said gear, locking means carried by said toggle link for locking said gear in extended and retracted positions, and actuating means connecting with said locking mechanism and said aircraft for raising and lowering said gear and for operating said locking mechanism.

5. A retractable landing gear for an aircraft having a door adapted to open only while raising and lowering said gear and wherein the movement of said gear operates said door comprising, an oleo pivotally carried by said aircraft, a drag strut including a piston rod pivotally connecting with said aircraft, a stepped piston formed on the free end of said rod having a larger working area on one side than on the other, a housing having a piston chamber and an annular reservoir chamber, said housing being adapted to receive said piston and rod and allow limited axial movement thereof relative to said housing, orifices allowing pressurized fluid communication between said chambers and on either side of said piston for absorbing dynamic shock loads, an arm pivotally connecting with the free end of said housing and extending to connect with said oleo, a locking mechanism connecting with said strut and oleo for locking said gear in extended and retracted positions, an actuating cylinder connecting with said locking mechanism for raising and lowering said gear, said locking mechanism being adapted for automatic locking and unlocking by relative movement between said cylinder and oleo, a compensating mechanism carried by said aircraft and operable by relative movement between said piston rod and housing and adapted to support said actuating cylinder so as to maintain a fixed position thereof relative to said oleo irrespective of relative movement between said piston rod and housing so as to prevent inadvertent unlocking of said gear, and means associated with said oleo including a spring for maintaining a substantially constant closing force on said doors when said gear is extended irrespective of telescopic movement of said strut, and a rigid mechanical linkage for operating said door and maintaining it in closed position when said gear is retracted.

6. A self-contained air-oil shock absorbing drag strut for an aircraft landing gear comprising a generally tubular housing, a transverse bulkhead rigidly fixed within said housing and forming a reservoir chamber and a piston chamber, a piston carried within said piston chamber and adapted for limited axial movement therein relative to said housing, a piston rod extending axially into said housing and connecting with said piston, said piston having a greater working area on one side than on the other whereby liquid under pressure tends to maintain said piston in an extreme axial position within said piston chamber, a chamber orifice providing fluid communication between said chambers and controlling the movement of said piston due to dynamic shock loads, and means including a piston orifice providing fluid communication through said piston and controlling the return stroke movement of said piston to eliminate oscillations induced by said dynamic shock loads.

7. A retractable landing gear for aircraft comprising a wheel supporting member pivotally connected at one end to said aircraft, a resilient shock absorbing drag strut pivotally connected at one end to said aircraft and at its opposite end to said wheel supporting member, locking means carried by said gear, actuating means connecting with said locking means for raising and lowering said gear, said locking means being responsive to relative movement between said actuating means and said locking means for locking and unlocking said gear, and compensating means carried by said aircraft and responsive to changes in the length of said strut due to loads for supporting said actuating means and maintaining said actuating means and said locking means in substantially fixed relative positions irrespective of said changes in the length of said strut whereby dependable automatic operation of said locking means is obtained.

8. A retractable landing gear for an aircraft having a door adapted to open only while raising and lowering said gear and wherein the movements of said gear operates said door comprising an oleo pivotally carried by said aircraft, a shock absorbing drag strut connected at one end to said aircraft and at its opposite end to said oleo, actuating means associated therewith for raising and lowering said gear, locking means carried by said gear and responsive to relative movement between said actuating means and said gear for locking said gear in down position, compensating means connecting with said strut for maintaining said actuating means and said locking means in substantially fixed relative positions irrespective of relative movement between said gear and aircraft due to shock absorbing action of said strut, and means connecting with said gear and said door maintaining a substantially constant closing force on said door in both extended and retracted positions of said gear irrespective of gear movement due to the action of said strut upon application of dynamic drag loads.

9. A retractable landing gear for aircraft comprising, a wheel supporting member pivotally connected at one end to said aircraft, a drag strut connecting at one end to said aircraft and at its opposite end to said wheel supporting member, said strut including a shock absorber, said shock absorber including a generally tubular housing, and a piston rod adapted to be received by said housing and extend axially therefrom to form a part of said strut, said piston rod being adapted for limited axial movement relative to said housing for damping vibrations due to shock loads, a locking mechanism associated with said strut for locking said gear in its extended position, actuating means connecting with said locking mechanism for raising and lowering said gear, said locking mechanism being responsive to relative movement between said actuating means and said locking mechanism for unlocking said gear, compensating means connecting with said housing and being fixed with respect to said piston rod for supporting said actuating means, and maintaining said actuating means fixed relative to said locking mechanism irrespective of relative movement between said piston rod and housing whereby inadvertent unlocking of said gear due to the application of dynamic drag loads is eliminated.

ALBERT E. KANODE.
CONRAD H. COOKE.
FREDERICK V. LINDQUIST.

REFERENCES CITED

The following references are of record in the file of this patent:

UNITED STATES PATENTS

| Number | Name | Date |
|---|---|---|
| 1,864,134 | Harris | June 21, 1932 |
| 2,467,015 | Dreifke | Apr. 12, 1949 |
| 2,559,451 | McBearty | July 3, 1951 |